| United States Patent [19] | [11] Patent Number: 4,629,608 |
| --- | --- |
| Lampton, Jr. et al. | [45] Date of Patent: Dec. 16, 1986 |

[54] PROCESS FOR THE REMOVAL OF H₂S FROM GEOTHERMAL STEAM AND THE CONVERSION TO SULFUR

[75] Inventors: Robert D. Lampton, Jr.; Thomas M. Hopkins, II, both of Lake Jackson, Tex.

[73] Assignee: The Dow Chemical Company, Midland, Mich.

[21] Appl. No.: 748,292

[22] Filed: Jun. 24, 1985

[51] Int. Cl.⁴ .......................... C01B 17/04; F03G 7/00
[52] U.S. Cl. ................................... 423/226; 423/230; 423/573 R; 55/73; 60/641.2
[58] Field of Search ............... 423/220, 230, 563, 564, 423/567 R, 575, 573 R, 226; 502/167; 60/641.2; 55/73

[56] References Cited

U.S. PATENT DOCUMENTS

| | | | |
| --- | --- | --- | --- |
| 4,076,621 | 2/1978 | Hardison | 423/573 R |
| 4,218,342 | 8/1980 | Thompson | 502/167 |
| 4,361,487 | 11/1982 | Hills et al. | 423/573 R |
| 4,374,104 | 2/1983 | Primack | 423/573 R |
| 4,382,918 | 5/1983 | Diaz | 423/573 R |
| 4,414,817 | 11/1983 | Jernigan | 423/573 R |
| 4,421,733 | 12/1983 | Blytas | 423/573 R |
| 4,468,929 | 9/1984 | Jernigan | 423/573 R |
| 4,528,817 | 7/1985 | Jernigan | 423/573 R |

*Primary Examiner*—Andrew H. Metz
*Assistant Examiner*—A. McFarlane
*Attorney, Agent, or Firm*—Benjamin G. Colley

[57] ABSTRACT

Process for removing H₂S from the exhaust steam in a geothermal power plant wherein the H₂S containing steam is contacted with an aqueous solution containing a ferric chelate and a cationic polymeric catalyst such as poly(dimethyldiallyl ammonium chloride). The conversion of H₂S to sulfur is accelerated by the use of a small amount of the catalyst.

9 Claims, 1 Drawing Figure

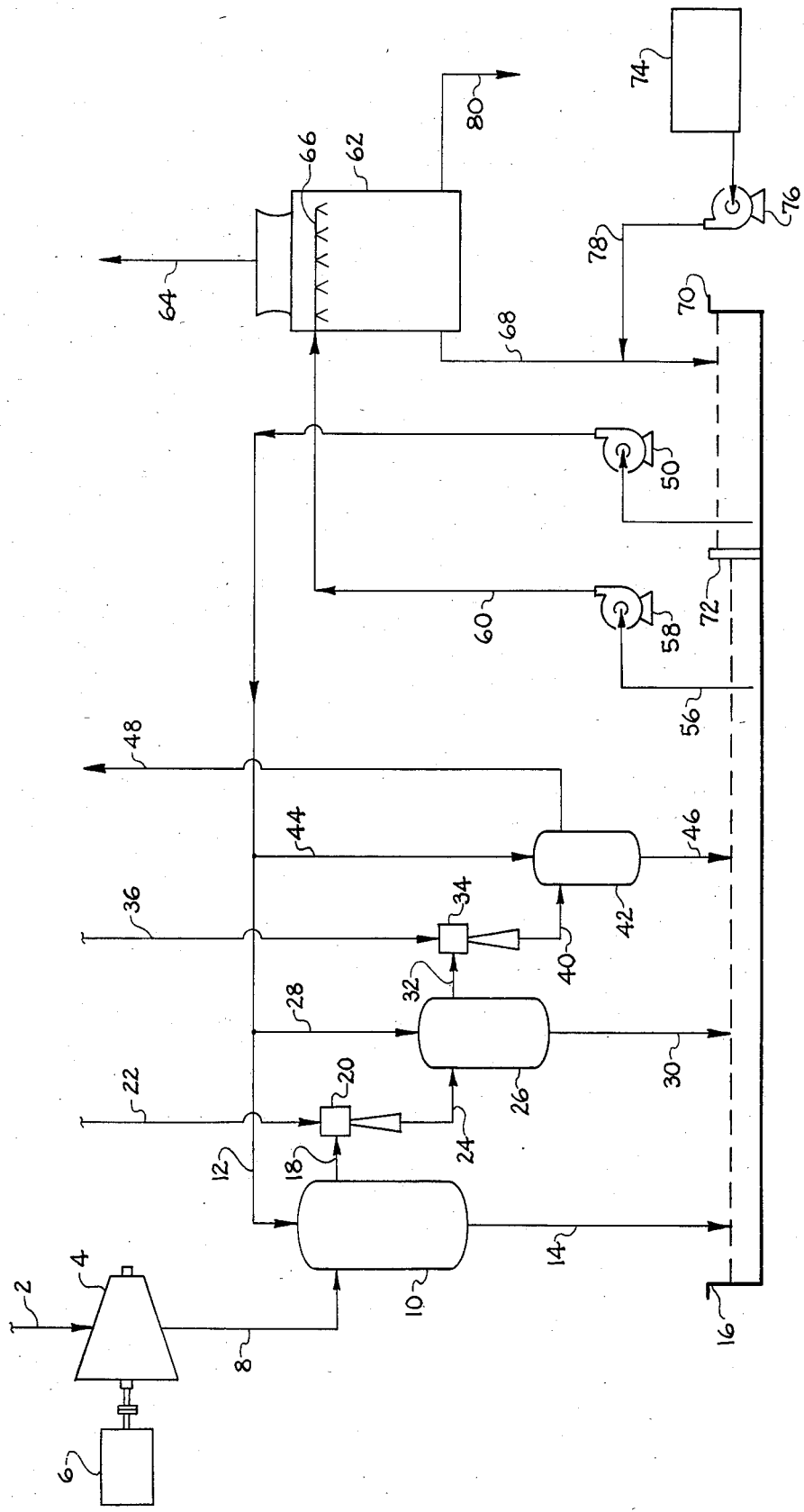

PROCESS FOR THE REMOVAL OF H₂S FROM GEOTHERMAL STEAM AND THE CONVERSION TO SULFUR

BACKGROUND OF THE INVENTION

This invention relates to a process wherein exhaust steam from a steam turbine operated by geothermal steam is condensed with an aqueous solution containing ferric chelate and the hydrogen sulfide in said geothermal steam is converted to free sulfur.

It is known from U.S. Pat. No. 4,123,506, dated Oct. 31, 1978, and U.S. Pat. No. 4,202,864, dated May 13, 1980, that geothermal steam containing H₂S can be purified by contacting the steam with a metal compound that forms insoluble metallic sulfides.

It is also known from U.S. Pat. No. 4,196,183, dated Apr. 1, 1980, that geothermal steam containing H₂S can be purified by adding oxygen and passing it through an activated carbon bed.

Various processes for hydrogen sulfide control in geothermal steam are outlined in the U.S. Department of Energy Report #DOE/EV-0068 (March 1980) by F. B. Stephens, et al.

U.S. Pat. No. 4,468,929, dated Sept. 4, 1984, shows the use of ferric chelate solutions to remove H₂S from exhaust geothermal steam with direct or indirect contact of the steam with chelate solutions.

SUMMARY OF THE INVENTION

The present invention is directed to a process wherein the H₂S in exhaust steam from a geothermal steam power plant is converted rapidly by means of a ferric chelate and a polymeric catalyst to free sulfur.

The process of this invention has the following steps:
(A) contacting a geothermal fluid stream containing H₂S in a first reaction zone with an aqueous solution at a pH range suitable for removing H₂S wherein said solution contains
  (1) an effective amount of at least one ferric chelate, and
  (2) an effective amount of one or more water soluble cationic polymeric catalysts
  whereby the conversion of H₂S to free sulfur is accelerated in the presence of said polymeric catalyst and said ferric chelate is reduced to ferrous chelate,
(B) contacting said solution containing ferrous chelate in a second reaction zone with an oxygen containing gas stream whereby said chelate is reoxidized, and
(C) recirculating said reoxidized solution back to said first reaction zone.

In the process of this invention about 80 percent of the H₂S gas in the geothermal steam is absorbed into the aqueous phase of a direct contact or indirect steam condensor whereby the H₂S is treated with ferric chelate to produce finely divided sulfur. The non-condensed or non-absorbed H₂S can be exhausted to the atmosphere or if zero discharge is desired or required, the H₂S gas can be absorbed with conventional H₂S absorbers.

BRIEF DESCRIPTION OF THE DRAWING

The FIGURE of the drawing illustrates a process in which this invention is applied for the oxidation of hydrogen sulfide contained in a liquid stream produced by the condensation of geothermal steam and as such eliminates the environmental pollution problems associated with the discharge of an effluent stream containing the toxic and noxious hydrogen sulfide.

In the drawing, the geothermal steam from line 2 is used to power a steam turbine 4 which is connected to an electric power generator 6. The turbine 4 exhausts through line 8 to a direct contact condenser 10. Cooling water containing chelated iron (ferric chelate) from line 12 is sprayed into condenser 10 for this condensation and passes from the condenser 10 through line 14 to the hot well 16 operating at 100°–125° F. Non-condensable gases such as $CO_2$, $N_2$, $O_2$, and $H_2S$ are removed from the main condenser 10 through line 18 by two steam jet ejectors 20 and 34 and the associated condensers 26 and 42. The ejectors 20 and 34 are operated by steam supplied by lines 22 and 36 respectively. These ejectors create a partial vacuum or low pressure zone. The exhaust steam from the ejector 20 is carried by line 24 to the condenser 26 and by line 32 to the second ejector 34. The exhaust steam from ejector 34 is carried by line 40 to condenser 42. Cooling water from line 12 is supplied to each of the condensers 26 and 42 by lines 28 and 44 respectively. The condensed steam from condensers 26 and 42 flows by means of lines 30 and 46 to the hot well 16. The non-condensable gases and the exhaust steam are then vented to a conventional scrubber through line 48 for removal of the remaining H₂S gas.

Pump 58 is used to pump the combined condensed geothermal steam and cooling water from the hot well 16 through line 60 to the induced-draft cooling tower 62 with internal spray heads 66 where an amount of water equal to approximately 80% of the condensed steam is evaporated by the air flow through the tower which also strips all of the dissolved hydrogen sulfide from the liquid and it would be vented to the environment by means of the air stream 64 except for the use of chelated metals as described herein. The excess condensed steam which is not evaporated overflows a weir (not shown) in the base of the cooling tower 62 for disposal by line 80. The remainder of the cold water flows through line 68 to the relatively cold well 70 which operates at 75°–85° F. Pump 50 is used to pump the cold water from the cold well 70 to the condensers 42, 26, and 10. The hot well 16 is separated from the cold well 70 by a weir 72.

In order to prevent the release of the dissolved hydrogen sulfide to the environment in the air stream 64 flowing from the top of the cooling tower 62, an amount of ferric chelate is added to the circulating water which is greater than the stoichiometric amount required to oxidize the dissolved hydrogen sulfide in the hot well 16. In this manner, the dissolved hydrogen sulfide is effectively oxidized before the water enters the top of the cooling tower 62 from line 60. The air flow and time of contact between the air and water in the cooling tower 62 is sufficiently long that the ferrous chelate which results from the oxidation of dissolved hydrogen sulfide in the hot well 16 and associated piping 56 and 60 is reoxidized to the active ferric state as it passes down through the cooling tower 62. Elemental sulfur in a finely divided solid form produced by this process circulates freely throughout the system and may be recovered by conventional means from the overflow line 80. Such recovery methods may allow the sulfur to agglomerate into a heavy slurry after which the supernatent liquid may be removed by decantation, centrifugation, filtration, and the like.

In order to maintain at least the stoichiometric amount of iron chelate required for this process, an amount of iron chelate concentrate is added from the storage vessel 74 by pump 76 and inlet line 68. The storage vessel 74 contains a composition comprising an aqueous solution containing sufficient soluble ferric chelate to give 3 to 15 weight percent iron and 0.5 to 10.0 percent by weight of one or more water soluble cationic polymeric catalysts.

Preferably, the ferric chelate is present in an amount to give 3.5 to 10 weight percent iron and most preferably the range is 4 to 5 percent by weight. The preferred range for the polymeric catalyst is 0.75 to 5.0 weight percent and 1.0 to 3.0 weight percent is the most preferred range. The amount of ferric chelate used herein is sufficient to provide a mol ratio of iron to $H_2S$ in the range from 2:1 to 4:1. The amount of polymeric catalyst is sufficient to provide a weight ratio of iron to catalyst in the range from 0.2 to 10:1.

The temperature range of the sulfide conversion step should be in the range from about 10° to about 99° C. and preferably in the range from about 25° to about 60° C.

The sulfide conversion step should also be conducted at a pH in the range from about 5 to about 10 and preferably in the range from about 6.8 to about 8.3.

Chelating agents useful in preparing the polyvalent metal chelate of the present invention include those chelating or complexing agents which form a water-soluble chelate. Representative of such chelating agents are the aminocarboxylic acids, such as nitrilotriacetic acid, N-hydroxyethyliminodiacetic acid, ethylenediaminetetraacetic acid, N-hydroxyethylethylenediaminetriacetic acid, diethylenetriaminepentaacetic acid, cyclohexanediaminetetraacetic acid, triethylenetetraaminehexaacetic acid and the like, including the salts thereof. Of such chelating agents, ethylenediaminetetraacetic, N-hydroxyethylethylenediaminetriacetic acid and N-hydroxyethyliminodiacetic acid, are most advantageously employed in preparing the ferric chelate used herein.

Examples of useful cationic polymeric catalysts to be used in this invention are polyethyleneamines, poly(2-hydroxypropyl-1-N-methylammonium chloride) and the 1,1-dimethyl analogue, poly[N-(dimethylaminomethyl)acrylamide, poly(2-vinylimidazolinum bisulfate), poly(diallyldimethyl ammonium chloride) and poly(N-dimethyl aminopropyl)-methacrylamide. These cationic polymers are well known and are commercially available under various tradenames. See, for example, Commercial Organic Flocculants by J. Vostrcil et al Noyes Data Corp. 1972 which is incorporated by reference herein. Other useful cationic catalysts are set forth in J. Macromol. Science-Chem. A4 pages 1327-1417 (1970) which is also incorporated by reference herein.

The following examples and controls are presented to further illustrate the invention.

CONTROL 1

At time zero, 1.071 gms of a 2000 ppm sodium sulfide solution was added to 250 ml of 0.1M borate buffered deionized water having a pH of 7.6 and containing 30 ppm ferric iron as the ferric chelate of N-hydroxyethylethylene diamine triacetic acid. Sodium sulfide was used as the sulfide source. This is a simulant for the addition of $H_2S$ to an iron chelate solution.

The solution changed color from light yellow to orange with the addition of the $Na_2S$. The color returned to light yellow and then became cloudy. It is believed that the last color change is indicative of the fact that sulfur has been formed.

Two time measurements were recorded. The time in seconds for the orange color to disappear after the addition of $Na_2S$ by visual inspection and the time in seconds for greater than 98% of the sulfide to disappear as measured by a sulfide-specific electrode. The results for this control were 18 and 53 seconds.

EXAMPLES 1-4

Following the procedures above, various cationic polymers were added to the chelate solution prior to the addition of the $Na_2S$. The results are set forth in the table below.

TABLE

| Examples | Polymer | PPM Polymer | Time for Orange to Disappear (Sec) | Time for Sulfide to Disappear (Sec) |
|---|---|---|---|---|
| 1 | Agefloc WT-40[1] | 50 | 2 | 24 |
| 2 | Nalco 8103[2] | 50 | 2 | 32 |
| 3 | Papa Polymer[3] | 50 | 2 | 34 |
| 4 | Dowell M-181[4] | 50 | 2 | 36 |
| Control | none | N.A. | 18 | 53 | where
[1] is poly (dimethyldiallyl ammonium chloride) from the CPS Chemical Company
[2] a cationic polyamine from Nalco Chemical Company
[3] polyalkylene polyamine of 60,000 mol. wt containing 30 mol. percent of 2-hydroxypropyltrimethyl ammonium chloride.
[4] blend of polyalkylene polyamine and polyethyleneimine of 20,000 molecular weight.

We claim:

1. A process for removing $H_2S$ from a geothermal fluid stream containing $H_2S$ which comprises
   (A) contacting said $H_2S$ stream in a first reaction zone with an aqueous solution at a pH range suitable for removing $H_2S$ wherein said solution contains
      (1) an effective amount of at least one ferric chelate, and
      (2) an effective amount of one or more water soluble cationic polymeric catalysts
   whereby the conversion of $H_2S$ to free sulfur is accelerated in the presence of said polymeric catalyst and said ferric chelate is reduced to ferrous chelate,
   (B) contacting said solution containing ferrous chelate in a second reaction zone with an oxygen containing gas stream whereby said ferrous chelate is reoxidized to form a ferric chelate containing solution, and
   (C) recirculating said ferric chelate containing solution back to said first reaction zone.

2. The process as set forth in claim 1 wherein said aqueous solution has a pH in the range from 5 to 10.

3. The process as set forth in claim 1 wherein the amount of ferric chelate is sufficient to provide a mol ratio of iron to $H_2S$ in the range from 2:1 to 4:1 and the amount of polymeric catalyst sufficient to provide a weight ratio of iron to catalyst in the range from 0.2:1 to 10:1.

4. The process as set forth in claim 3 wherein said chelate is the ferric chelate of N-hydroxyethyl ethylene diaminetriacetic acid and said polymeric catalyst is poly(dimethyldiallyl ammonium chloride).

5. The process as set forth in claim 1 wherein said ferric chelate has a chelating agent selected from the group consisting of nitrilotriacetic acid, N-hydroxyethyl aminodiacetic acid, ethylenediaminetetraacetic acid, N-hydroxyethylethylenediamine triacetic acid, diethylenetriaminepentaacetic acid, cyclohexene diamine tetraacetic acid, and triethylenetetraaminehexaacetic acid.

6. The process as set forth in claim 1 wherein said polymeric catalyst is selected from the group consisting of polyethylene amines, poly(2-hydroxypropyl-1-N-methyl ammonium chloride), poly(2-hydroxypropyl-1,1-N-dimethyl ammonium chloride), poly(N-dimethylaminomethyl)-acrylamide, poly(2-vinylimidazolimum bisulfate), poly(diallyldimethyl ammonium chloride), and poly(N-dimethylaminopropyl)-methacrylamide.

7. In a process for removing $H_2S$ from a geothermal stream containing $H_2S$ by contacting the $H_2S$ stream with an aqueous solution containing at least one ferric chelate to convert $H_2S$ to free sulfur and reduce ferric chelate to ferrous chelate and regenerating the ferrous chelate with an oxygen containing gas stream, the improvement which comprises accelerating the conversion of $H_2S$ to free sulfur by having an effective amount of one or more water soluble cationic polymeric catalysts present during said contacting step.

8. The process as set forth in claim 7 wherein the amount of said polymeric catalyst is sufficient to provide a weight ratio of iron to catalyst in the range from 0.2:1 to 10:1.

9. The process as set forth in claim 8 wherein said catalyst is poly(dimethyldiallyl ammonium chloride).

* * * * *